United States Patent [19]
Luecke et al.

[11] Patent Number: 5,303,035
[45] Date of Patent: Apr. 12, 1994

[54] PRECISION MICROPOSITIONER

[75] Inventors: Francis S. Luecke; David F. Arnone, both of Mountain View, Calif.

[73] Assignee: New Focus, Inc., Sunnyvale, Calif.

[21] Appl. No.: 878,427

[22] Filed: May 4, 1992

[51] Int. Cl.⁵ .................. G01B 11/00; F16M 11/12
[52] U.S. Cl. ................................. 356/399; 33/1 M; 248/183; 269/73; 108/138
[58] Field of Search ............... 356/399, 400, 401, 244; 108/20, 138, 143; 33/1 M; 269/71, 73; 359/393; 248/183

[56] References Cited

U.S. PATENT DOCUMENTS

| | | | |
|---|---|---|---|
| 3,790,155 | 2/1974 | Longamore | 269/73 X |
| 3,829,978 | 8/1974 | Basin et al. | 33/1 M X |
| 4,770,531 | 9/1988 | Tanaka et al. | 33/1 M X |
| 4,854,532 | 9/1989 | Trovato | 248/183 X |
| 4,948,330 | 8/1990 | Nomura et al. | 269/73 X |

OTHER PUBLICATIONS

Stankiewicz, "Swivel Mounting", IBM Technical Disclosure Bulletin, vol. 20 #3, 1977, pp. 968-969.

Primary Examiner—Robert J. Warden
Assistant Examiner—E. Leigh Dawson
Attorney, Agent, or Firm—Donald R. Boys

[57] ABSTRACT

A micropositioner has a platform supported on balls positioned by inclined planes machined on plungers. The plungers are adjustable in horizontal bores in a frame which has a vertical portion with adjusting screws for horizontal positioning of the platform and rotation about a vertical axis. The micropositioner provides four degrees of freedom with four adjustable screws in one embodiment, five degrees of freedom in an alternative embodiment, and six degrees of freedom in yet another embodiment.

18 Claims, 12 Drawing Sheets

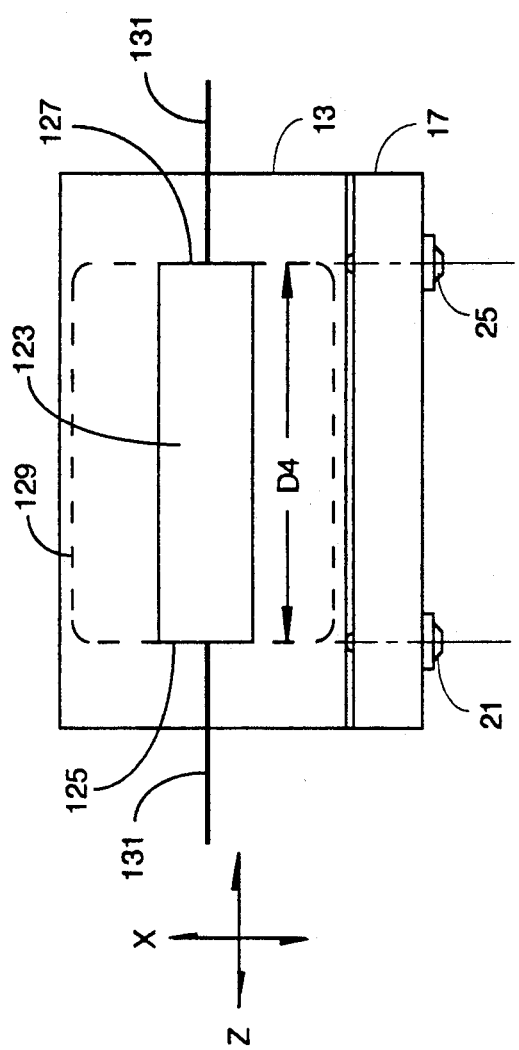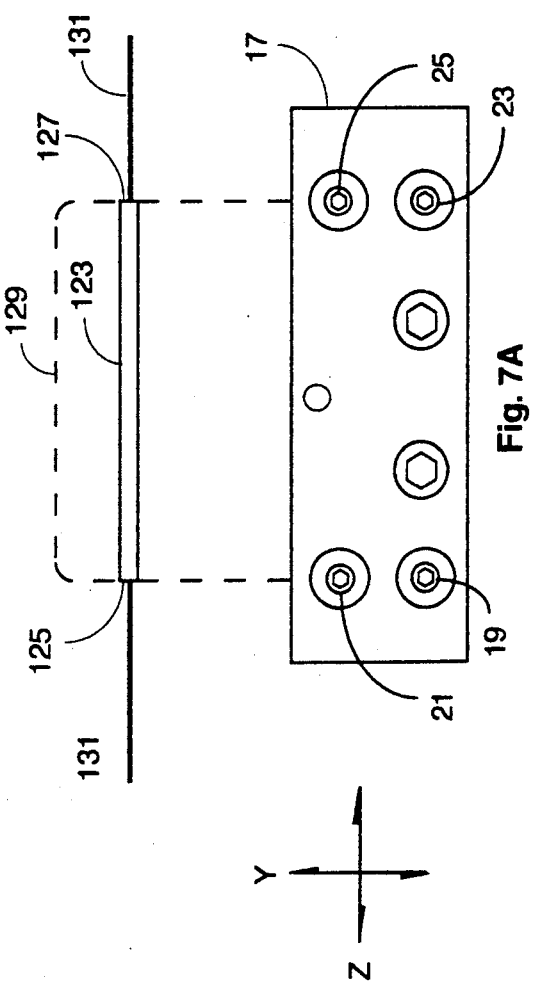

PRECISION MICROPOSITIONER

FIELD OF THE INVENTION

The present invention is in the area of mechanical positioning devices which are adjustable along multiple axes including linear and rotational adjustment relative to principal axes.

CROSS REFERENCE TO RELATED APPLICATIONS

The present invention is related to copending application Ser. No. 07/785,773, filed Oct. 31, 1991, also titled "Precision Micropositioner".

BACKGROUND OF THE INVENTION

There are many devices intended to provide physical placement and manipulation of objects along and around multiple axes. Often, mechanical, optical, electronic, genetic, medical, and chemical disciplines require exact placement of various components combined with an ability to manipulate in one or more dimensions. Possibly one of the more prominent needs is in the optical world of precision lasers, lenses, and fiber optics. Accuracies are often called out in subwavelength dimensions and will go into the subatomic region in the future, such as for scanning tunneling microscopes (STM) and atomic force microscopes (AFM).

Conventional methods include a series of adjustable leadscrews which are attached to a working platform or table at one end and some suitable base on the other. Each axis may then be manipulated by turning a micrometer type positioner a prescribed amount which, in suitable base on the other. Each axis may then be manipulated by turning a micrometer type positioner a prescribed amount which, in turn, moves the working platform or table to the desired position relative to its base or some other reference such as an optical axis.

Many commercially available positioners require that the item to be positioned (e.g., lens, mirror) be mounted within the confines of a relatively small area, usually a circle, in the central portion of the positioner. Others call for cantilevered positioning of the item to be positioned. Both of these conditions have large potential for limiting the usefulness of the positioner.

In the first case mentioned above, versatility is limited due to the physical limitation placed on the size of item to be positioned. One is required to have several different positioners with differing sized working diameters to satisfy differing needs because of size differences of objects to be positioned.

Loads that are placed on a positioner in a cantilevered position can cause bending stresses on elements of the positioner. The torque may result in flexing or bending with an undesirable deflection which may give rise to cross-coupling. Cross-coupling is a phenomenon wherein adjustment of one parameter (in one degree of freedom) disturbs a setting in another parameter. For example, changing position along the principal X-axis may also change position along the Y-axis or the Z-axis, and the unwanted change may not be immediately apparent to the user.

As requirements for positioning become more stringent, cross-coupling becomes more of a problem, because movement that might previously have been acceptable is no longer acceptable because of the more stringent requirements. Trends in design have been to more complicated and therefore more expensive micropositioners.

If cross-coupling is going to be a problem, and readjustment will be needed in any case, then a viable approach would be to eliminate guides, bearings, and pivots to the greatest degree possible, providing maximum accuracy, stability, and versatility with a minimum of sophistication, accepting a certain amount of cross-coupling as a consequence, and committing to the readjustment that cross-coupling demands. Moreover, there are many applications where cross-coupling is not as serious as in some other applications.

What is clearly needed is a micropositioner which overcomes the problems of load centering and allows for different sizes and shapes of objects without giving up other needed characteristics such as resolution, repeatability, travel range, and overall desired accuracy. The new positioner should minimize complexity and parts to reduce manufacturing cost. Such a positioner would allow one versatile piece of equipment to take the place of several devices at a reduced cost.

SUMMARY OF THE INVENTION

A micropositioner for adjusting position of an object is provided according to an embodiment of the invention having an adjustable platform for supporting and positioning the object. The platform means is supported by three balls from below in a triangular pattern of points. The micropositioner has an elevation system contacting each of the three balls to position the balls vertically to adjust the vertical position of the platform and to rotate it about at least one horizontal axis. There is a first adjustment mechanism contacting a first side of the platform at two points for moving the platform in a first horizontal direction and rotating it about a vertical axis, and a second adjustment mechanism contacting the platform at one point for moving the platform in a second horizontal direction, substantially at 90 degrees to the first horizontal direction, measured in a horizontal plane.

In a preferred embodiment the elevation system comprises plungers guided in horizontal bores intersecting vertical bores for guiding the three support balls, one plunger having one inclined plane for contacting and moving one of the balls vertically, and another plunger having two inclined planes for moving the other two balls. The frame has raised vertical portions for mounting the first and second adjustment mechanisms, which can be adjusting screws or plungers with inclined planes.

The micropositioner with two horizontal plungers in the elevation system provides five degrees of freedom. In a further alternative embodiment each of the three support balls is associated with an individual horizontal plunger, and two of the balls are arranged in a line in the direction of one of the horizontal adjustment directions for the platform. In this embodiment the micropositioner provides six degrees of freedom, the six degrees being translation along three orthogonal axes and rotation about each of the orthogonal axes.

The micropositioner is designed with the minimum number of moving parts to provide four, five, and six degrees of freedom for positioning, and by utilizing a platform upon which objects may be mounted, is a much more versatile positioner than those that require that an object to be positioned be mounted within an array of adjustment hardware. Also because of the minimum number of parts, complexity and cost are significantly reduced.

BRIEF DESCRIPTION OF THE DRAWINGS

FIG. 7A is an elevation view of a micropositioner according to the present invention for positioning a laser modulation crystal.

FIG. 7B is a plan view of the micropositioner of FIG. 7A.

DESCRIPTION OF THE PREFERRED EMBODIMENTS

Figure 1:
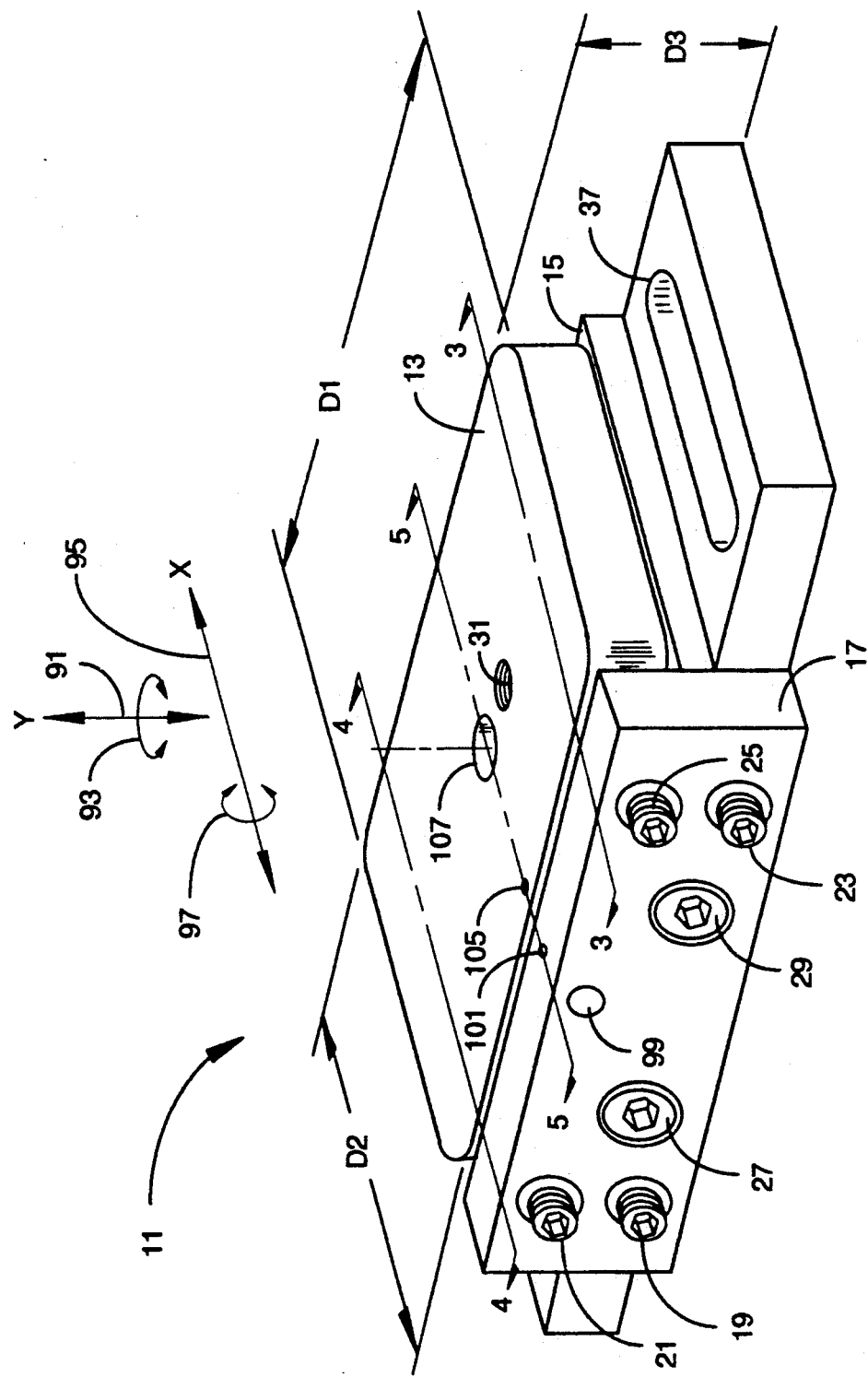
FIG. 1 is an isometric view of a micropositioner according to the present invention.
Figure 2:
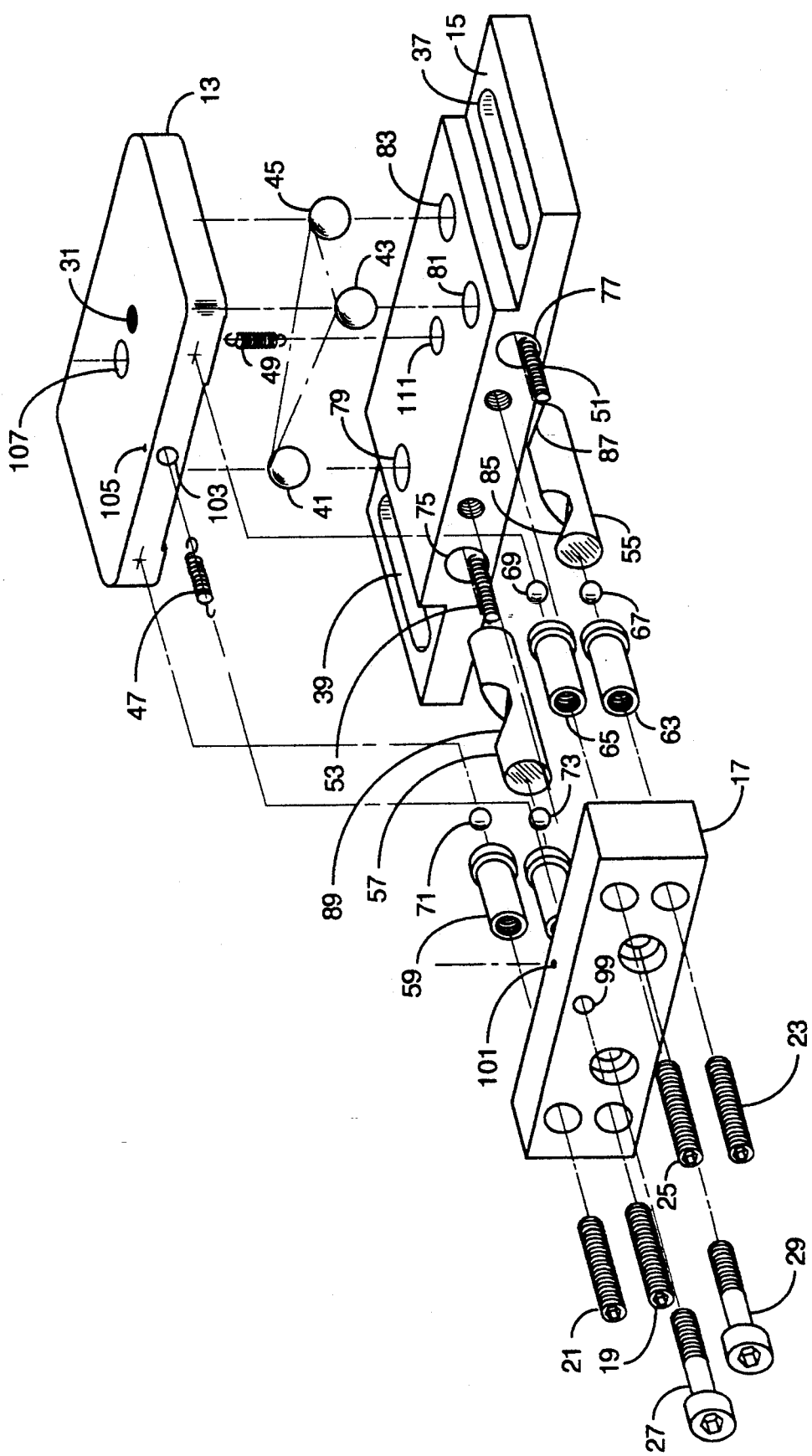
FIG. 2 is an exploded view of the positioner of FIG. 1.

FIG. 1 is an isometric view of a precision micropositioner 11 according to one embodiment of the present invention. FIG. 2 is an exploded view of the positioner of FIG. 1. A substantially rectangular slotted plate 15, machined from aluminum and anodized, is suited for mounting to a table such as an optical bench utilizing slotted ends 37 and 39. Support 17, also anodized aluminum, is fastened to slotted base 15 forming an "L" shape. Screws 27 and 29 hold support 17 rigidly against base plate 15 through threaded holes in plate 15.

Platform 13 is a rectangular hard anodized aluminum plate which rests on three actuator balls 41, 43, and 45 (see FIG. 2). The use of three balls provides a stable base for the platform. Platform 13 has a threaded hole 31 which provides a convenient method for mounting objects and instruments to be positioned to the plate. The placement of the mounting hole is a convenience rather than a requirement, and in other embodiments there may be no mounting hole at all, or more than the one shown. In the embodiment described, dimension D1 is about 5.5 cm (about 2.18 inches), D2 is about 3.6 cm. (about 1.43 inches), and D3 is about 2.5 cm. (about 1 inch).

Linear movement along the direction of X-axis 95 is achieved by rotating adjustment screws 21 and 25 in equal amounts in the same direction. Angular movement around axes parallel to the Y-axis, indicated by arrows 93, is achieved by adjusting screws 21 and/or 25 by different amounts and/or in opposite directions of rotation.

Linear movement along the direction of Y-axis 91 is achieved by rotating adjustment screws 19 and 23 in equal amounts in the same direction. Angular movement around axes parallel to X-axis 95, indicated by arrows 97, is achieved by adjusting screws 19 and/or 23 by different amounts and/or in opposite directions of rotation.

Working platform 13 rests upon actuator balls 41, 43, and 45. In this embodiment the actuator balls are preferably precision ground stainless steel ball bearings, about 9.5 mm in diameter, but could be made from several other suitable materials. Working platform 13 is held securely against actuator balls 41, 43, and 45 by extension spring 49, and against support 17 by extension spring 47. Plunger bores 75 and 77 act as guides for plunger 55 and plunger 57. The plungers are preferably brass, which has an acceptable coefficient of friction with anodized aluminum, but could be made from other materials.

The purpose of plunger 55 is to provide vertical movement of balls 43 and 45 from horizontal movement of screw 23. Adjustment screw 23 is precision threaded with eighty threads per inch and passes through precision threaded shoulder nut 63. One full turn of adjustment screw 23 moves interface bearing 67 along the axis of plunger bore 77 by 0.0125" (about 0.3 mm). Plunger 55 moves exactly the same amount along bore 77 compressing spring 51. Because actuator ball 43 rests against an inclined plane cut in plunger 55, any lateral movement in the X-direction translates into a vertical component which is in magnitude equal to the lateral movement times the tangent of the angle formed between the axis of the plunger and the incline angle cut in the plunger. If, for example, the angle of incline 85 and 87 with the axis of the plunger is 45 degrees, the lateral movement of plunger 55 translates into an equal vertical movement of balls 43 and 45. In other embodiments, this angle may be altered to more or less than 45 degrees which would give greater precision in the case of a shallower angle but would require more turns of adjustment screw 23 for a given displacement along the Y direction.

If the planes are cut at different angles on plunger 55, balls 43 and 45 do not translate vertically by the same amount with a specific translation of plunger 55. Rather, a compound movement is imparted to plate 13. For example, as a special case, plane 85 might be cut parallel to the axis of plunger 55, and therefore not be inclined at all. If plane 87 is cut at an angle with the axis of the plunger, say 45 degrees, then adjustment of plunger 55 will impart Y displacement to only the point of contact of ball 45 with platform 13. In this special case, platform 13 is made to rotate about an axis passing through the points of contact of balls 41 and 43 with platform 13. Selective provision of inclination angles for the plungers is thus seen to provide specialized absolute movement of the support platform.

Turning adjustment screw 19 operates much as turning screw 23 with the exception that plunger 57 moves actuator ball 41 whereas moving adjustment screw 23 moves both actuator balls 43 and 45 at the same time. Turning adjustment screws 23 and 19 equal amounts in the same direction will move the working platform to a new vertical position parallel to its prior position.

Turning only one adjustment screw, for example screw 23, while allowing adjustment screw 19 to remain at rest will cause the working platform to rotate around an axis parallel to the X-axis. There is no absolute rotational axis for rotational adjustment.

In the embodiment described, elements that have contact with other elements, creating regions of possible friction and wear, are lubricated with a low vapor pressure synthetic lubricant, which avoids evaporation and serves to keep the parts lubricated for long periods.

Figure 3:
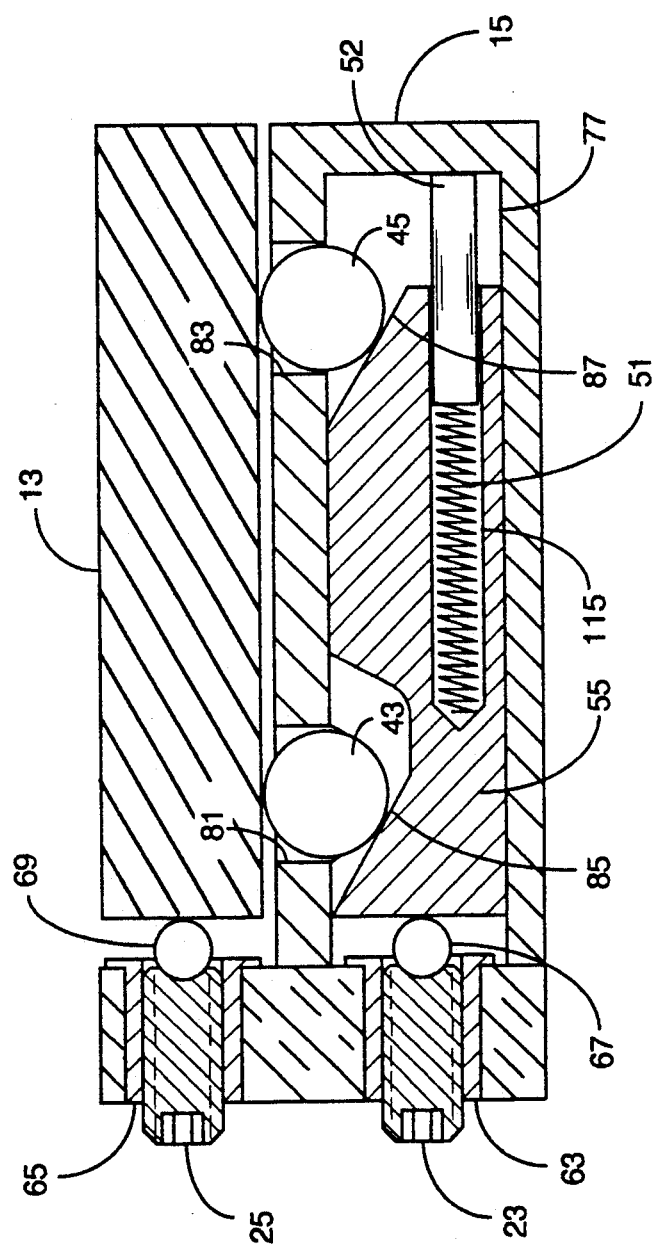
FIG. 3 is a section view along line 3—3 of FIG. 1.

FIG. 3 is a cross section taken along line 3—3 of FIG. 1. Precision threaded shoulder nuts 63 and 65 and interface bearings 67 and 69 are exposed in this view. Vertical adjustment is achieved on this end of platform 13 by adjusting screw 23 which passes through precision threaded shoulder nut 63. This movement is transmitted through interface bearing 67 which moves plunger 55 in the direction of the X-axis. Assuming that adjustment screw 23 has a right-hand thread and is turned in a clockwise direction (viewed from the front of the apparatus), plunger 55 moves to the right (as viewed in FIG. 3), compressing return spring 51 against pin 52, and moving plunger incline surfaces 85 and 87 to the right. Pin 52 serves to retain spring 51 in bore 115 and to prevent kinking of the spring. This motion moves actuator balls 43 and 45 up through guide bores 81 and 83 in base 15. The movement of balls 43 and 45 raises platform 13 at the point of contact of balls 43 and 45 in the direction of the Y-axis an amount proportional to the rotation of adjustment screw 23. As the platform raises, return spring 49 is extended (see FIG. 5).

Adjustment of screw 25 translates through shoulder nut 65 and interface bearing 69 in much the same manner as the movements described above relating to adjusting screw 23. A different motion of platform 13 is generated since interface bearing 69 bears against the side of platform 13 moving it toward or away from support 17 a distance proportional to the amount of rotation of adjustment screw 25. In moving toward or away from support 17, the platform slides on balls 41, 43, and 45.

Figure 4:
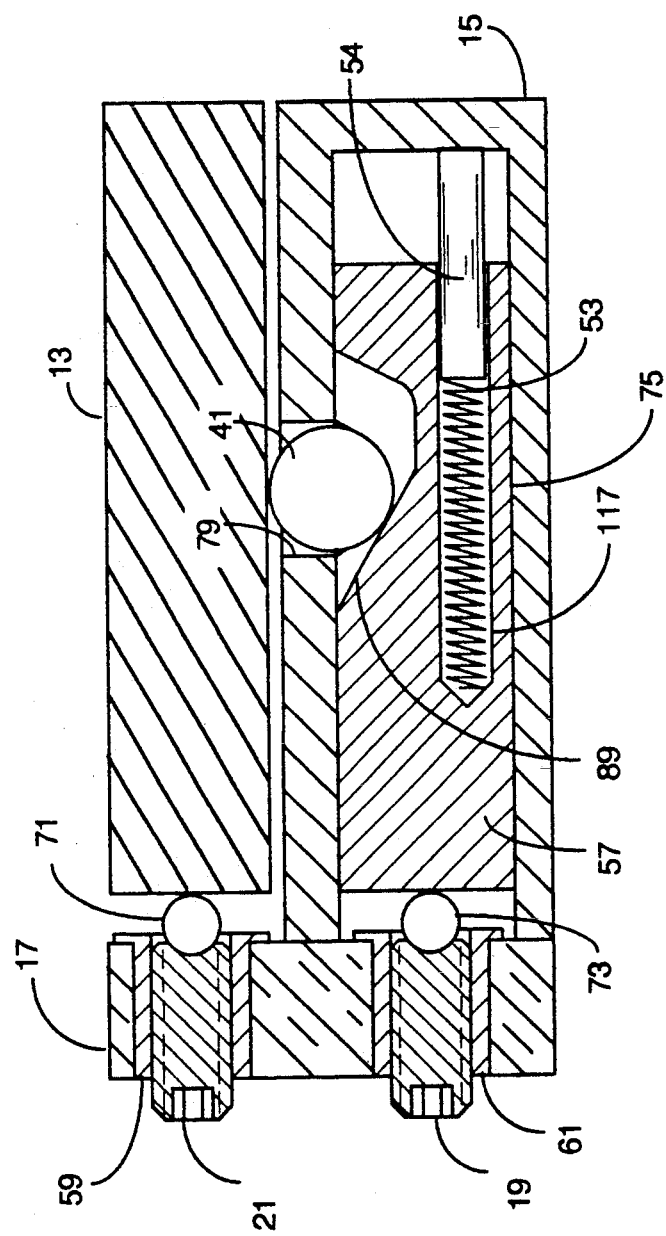
FIG. 4 is a section view along line 4—4 of FIG. 1.

FIG. 4 is a cross-sectional view taken along section line 4—4 of FIG. 1. The main difference between FIG. 4 and FIG. 3 is that the plunger in FIG. 4 has only one incline surface 89 and one actuator ball 41 whereas in FIG. 3, plunger 55 has two incline surfaces, 85 and 87, and two actuator balls, 43 and 45. Movement of plunger 57 by adjustment of screw 19 raises and lowers ball 41 by virtue of inclined plane 89, and raises and lowers platform 13 at the point of contact of the ball by the same amount. When plunger 57 moves to the right in FIG. 4 it compresses spring 53 against pin 54.

Figure 5:
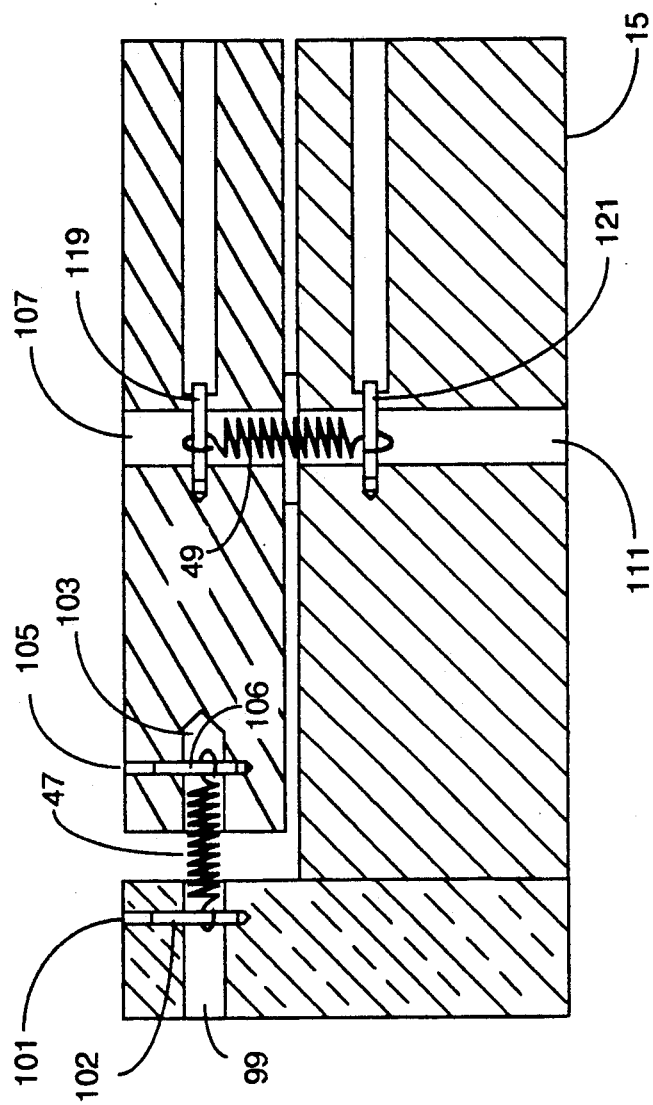
FIG. 5 is a section view along line 5—5 of FIG. 1.

FIG. 5 is a section view taken along section line 5—5 of FIG. 1. The method of attaching the return springs is shown in this view. X-axis return spring 47 attaches to roll pins 102 and 106 installed in bores 101 and 105 across clearance bores 99 and 103, and urges platform 13 at all times against interface balls 69 and 71 (see FIG. 2). Y-axis return spring 49 connects to roll pins 119 and 121 installed across clearance bores 107 and 111, and urges platform 13 at all times against balls 41, 43, and 45. In some embodiments set screws can be used instead of roll pins.

Figure 6:
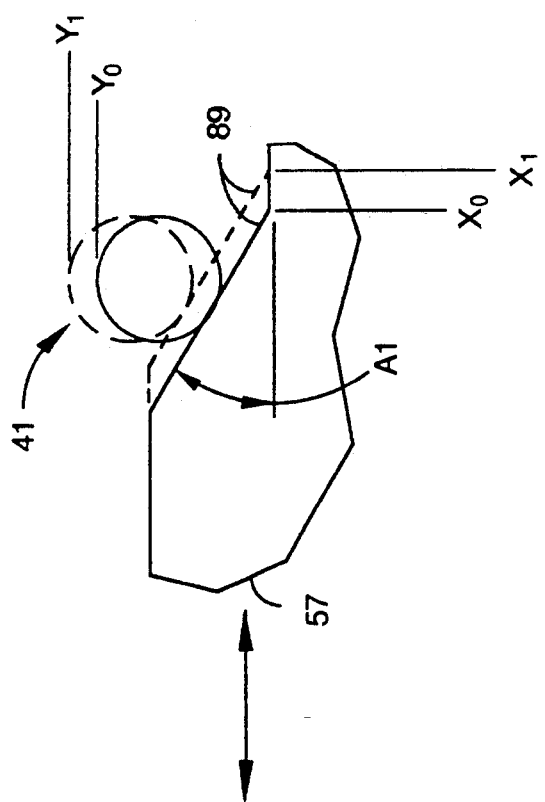
FIG. 6 is an illustration of a plunger, inclined plane, and ball to better illustrate the mechanism of adjustment.

FIG. 6 shows in further detail how plunger movement translates into vertical movement of an actuator ball and thence of a portion of platform 13 through a hole in base 15. When plunger 57 moves from X0 to X1, actuator ball 41 moves vertically from Y0 to Y1. With a given change in X, Y changes according to the tangent of angle A1, the angle of the inclined plane with the axis of the plunger. By altering the angle of an incline with the axis of the plunger, different degrees of precision may be obtained.

There are in the embodiment of the present invention described, no rotational guides for the plungers. Downward pressure from balls on the inclined planes provides a restoring force if a plunger tends to rotate. The force required of the springs in the embodiment described varies depending on the use of the positioner. For example, for a positioner used in an application where no movement is expected, the restoring forces provided by the springs may be relatively light. For applications where there may be movement, therefore inertia forces exerted by the masses of the components undergoing changes in direction, the springs must be chosen to provide restoring forces of at least the magnitude of the expected acceleration forces, and preferably several times the expected acceleration forces.

Platform 13, which is a base for holding a device or instrument to be positioned, is allowed to float in position on the three supporting balls, within the constraint of the two tension springs. There are no rigid guides for translation and similarly no rigid pivot points for rotation. This arrangement is intentional to limit the number of parts, thereby limiting the complexity and attendant cost of the positioner according to the invention. In many prior art designs, complicated pivots and translation guides are used to provide absolute translation and rotation about absolute axes. In the present invention, rotation is provided around axes parallel to the principal axes, and absolute adjustment is made by translation after rotational adjustment.

The present invention is particularly suited for positioning a crystal to align with a laser beam. FIG. 7A is an elevation view of the micropositioner as described in the above embodiment, and FIG. 7B is a plan view of FIG. 7A. A crystal 123 is shown having a facet 125 on one end and a facet 127 on the other end. The crystal is supported on the micropositioner by an instrument represented by dotted outline 129, which is fastened securely to the platform of the micropositioner. In this example a laser beam 131 is incident on facet 125, passes through the crystal, and emerges from facet 127. Distance D4 between the facets is the same as the distance between the centerlines of the plungers, which is the same as the distance between the point of contact of ball 41 and the platform, and the line between balls 43 and 45 at their points of contact with the platform.

The overall height (Y-direction) of the crystal can be adjusted, as described above by making equal adjustments of adjustment screws 19 and 23, assuming that the incline angles on the plungers are equal. The position in the X-direction (FIG. 7B) can be adjusted by equal adjustment of adjustment screws 21 and 25. Once these two adjustments are made to position the crystal roughly where a user wants it to be relative to the laser beam, fine adjustments can be made of one facet relative to the laser beam without significantly altering the position of the beam on the other facet. This is true because the distance between the facets is the same as the centerline separation of the plungers. If one adjusts screw 23, for example, without adjusting screw 19, the Y position of facet 127 is directly changed, while the Y position of facet 125 will change only a tiny amount, as rotation in this case will be about an axis parallel with the X-axis and passing through the point of contact between platform 13 and support ball 41 (see FIG. 2).

If one adjusts screw 19 and not screw 23, rotation is about an axis parallel to the X-axis through the points of contact of platform 13 with support balls 43 and 45. In this case facet 125 is adjusted in the Y-direction while facet 127 is affected hardly at all.

Similarly, if one adjusts screw 21 and not screw 25, the X position of facet 125 is altered directly, while facet 127 is little affected. And finally one may use screw 25 while not adjusting screw 21 to move facet 127 in the X-direction while leaving facet 125 substantially unaltered in position.

In the embodiment of a precision micropositioner described above there are four degrees of freedom, and the positioner is referred to in the art as a four-axis device. The adjustments, relative to the axes shown in FIG. 1, are translation in X-direction, rotation about the X-axis, translation in the Y-direction, and rotation about the Y axis. Generally speaking, fewer degrees of freedom translate to lower complexity and cost. There are, however, situations in which five and six-axis positioners are desirable.

Figure 8:
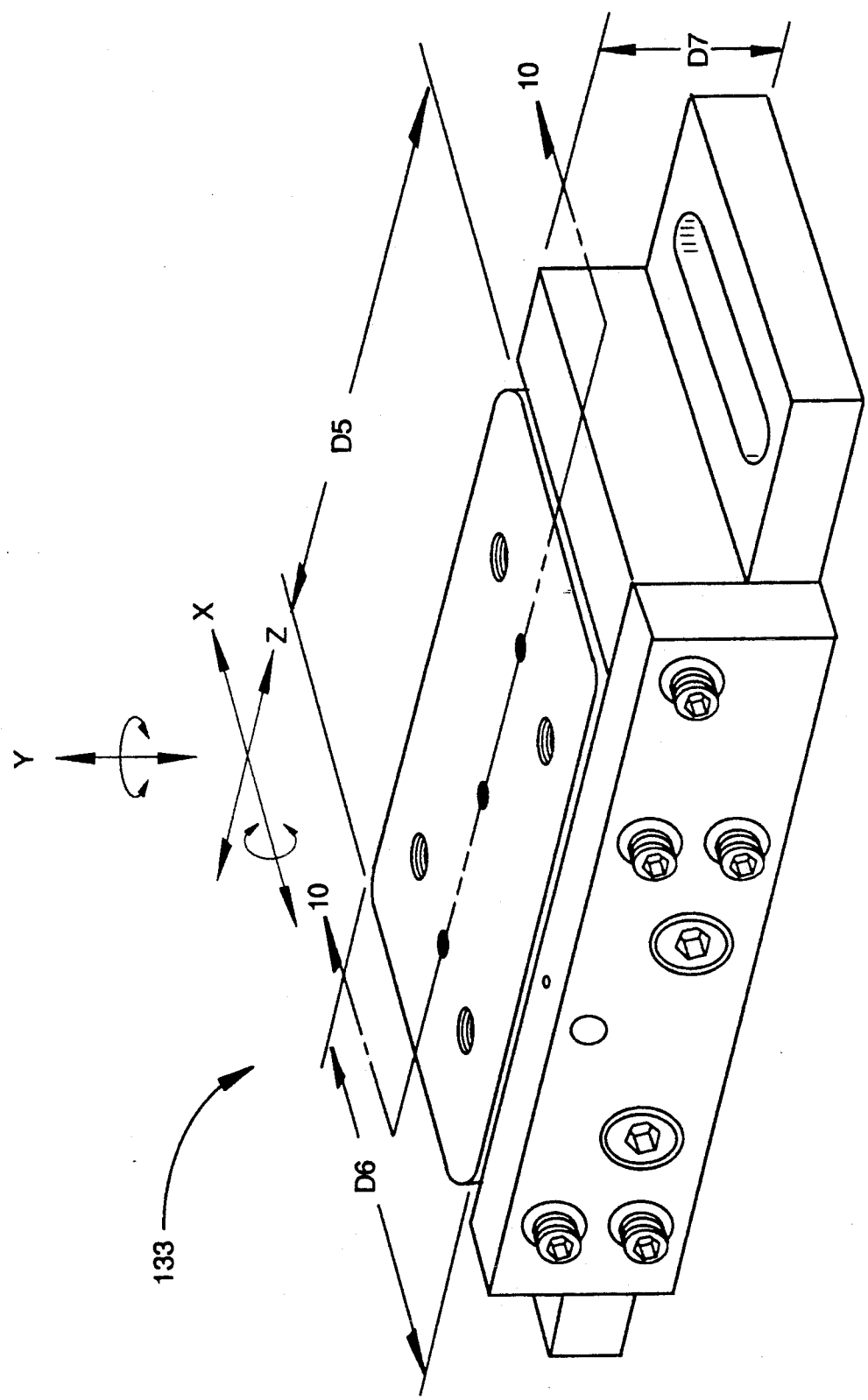
FIG. 8 is an isometric view of a five-axis micropositioner

FIG. 8 is an isometric view of a five-axis precision micropositioner 133 according to an embodiment of the present invention. The five-axis micropositioner possesses the same four degrees of freedom described for a four-axis positioner plus adjustment along the Z-axis. In this embodiment, dimension D5 is about 6 cm (about 2.33 inches), D6 is about 3.8 cm. (about 1.50 inches), and D7 is about 2.5 cm. (about 1 inch).

Figure 9:
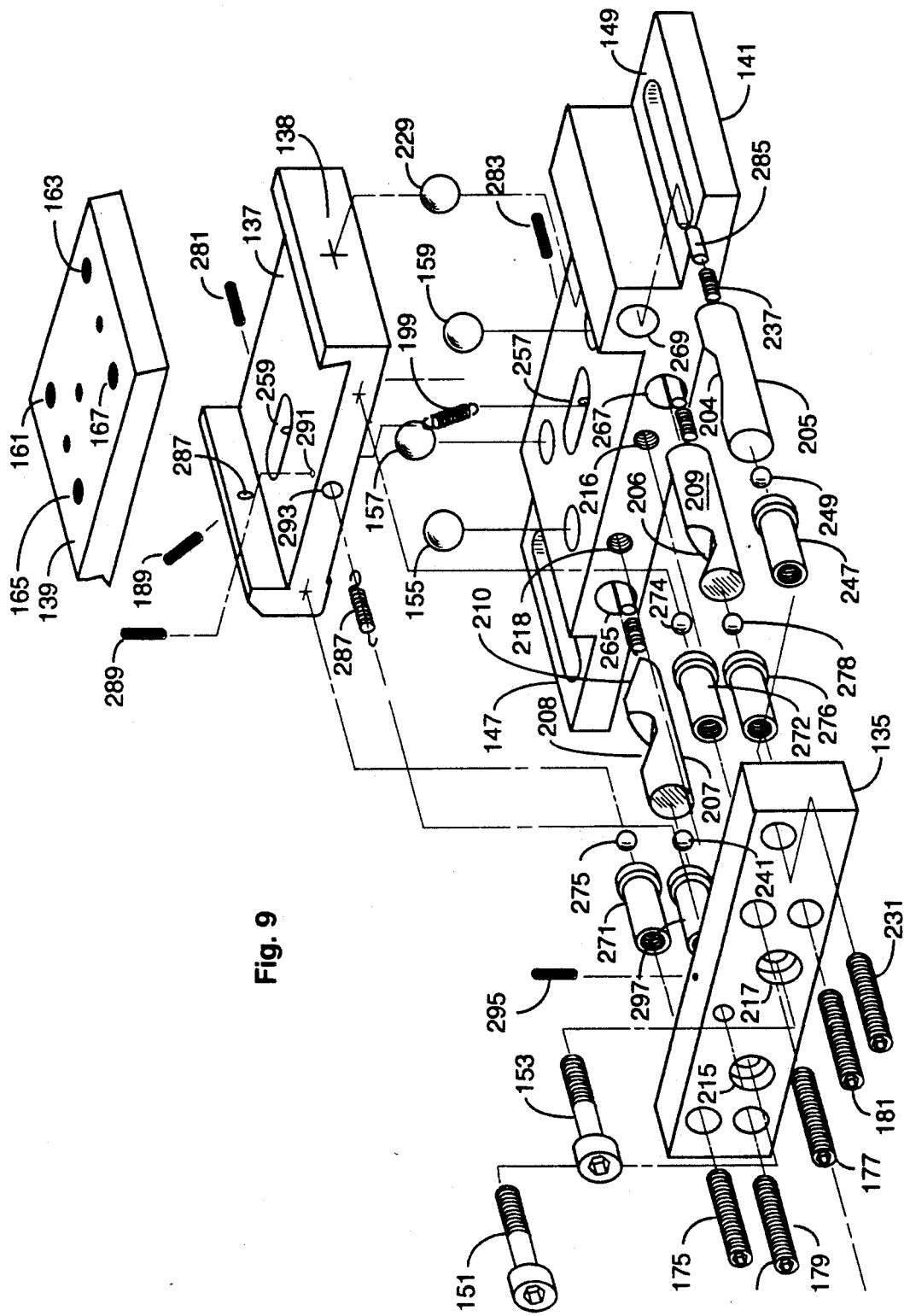
FIG. 9 is an exploded view of the positioner of FIG. 8.

FIG. 9 is an exploded view of the five-axis positioner of FIG. 8. A substantially rectangular slotted base plate 141, machined from aluminum and anodized in this embodiment, is suited for mounting to a table, such as an optical bench, utilizing slotted ends 147 and 149. A support 135, also anodized aluminum, is fastened laterally to slotted base plate 141. Screws 151 and 153 hold support 135 rigidly against base plate 141 through holes 215 and 217 in platform 135, engaging in threaded holes 216 and 218 in base plate 141.

An adjustment screw 181 bears against a hardened ball 278 which in turn urges against a plunger 209, which bears against an actuator ball 157 by an inclined plane 206. Another adjusting screw 179 bears against a ball 241 which in turn bears against a plunger 207 having two inclined planes 208 and 210. Plunger 207 thus moves two actuator balls 155 and 159. Turning adjustment screw 181 operates much the same as turning adjustment screw 179 with the exception that plunger 209 moves actuator ball 157, whereas turning adjustment screw 179 moves both actuator balls 155 and 159 at the same time.

Turning adjustment screws 179 and 181 equal amounts in the same direction will move a working platform 137 to a new vertical position parallel to its prior position. Turning only one adjustment screw, for example screw 179, while allowing adjustment screw 181 to remain at rest, will cause the working platform to rotate around an axis parallel to the X-axis. There is no absolute rotational axis for rotational adjustment. Both linear and angular movement are just as they are in the previous embodiment as they pertain to plungers 207 and 209 and plunger bores 265 and 267 (see FIG. 9).

Working platform 137 is urged toward support 135 by a spring 287. Pin 289, inserted in bore 291, holds spring 287 in working platform 137. Spring 287 is held in the top of support 135 by pin 295 passing through bore 297. In some embodiments set screws are used instead of pins.

Movement of the working platform in the X-direction and rotation about the Y-axis are accomplished much the same as in the 4-axis positioner described above. In the case of the 5-axis positioner, referring to FIG. 9, adjusting screw 175 engaged in threaded nut 271 bears against ball 275 which in turn bears against platform 137. Similarly adjusting screw 177 engaged in threaded nut 272 bears against ball 274 which in turn bears against platform 137. Turning both screws 175 and 177 in the same direction by the same amount causes platform 137 to translate in the X-direction. Turning the adjusting screws either in opposite directions or by different amounts causes platform 137 to rotate about an axis parallel to the Y-axis.

As in the previously described embodiment, there are no rotational guides for the plungers. Downward pressure from balls on the inclined planes provides a restoring force if a plunger tends to rotate.

Horizontal adjustment along the Z axis is achieved preferably by adjusting a screw 231 which passes through precision threaded shoulder nut 247. This movement is transmitted through an interface bearing 249 which moves a plunger 205 in the direction of the X-axis. Assuming that adjustment screw 231 has a right-hand thread and is turned in a clockwise direction, plunger 205 compresses a return spring 237 against a pin 285, and moves plunger incline surface 204 in the direction of the X axis. Plunger inclined surface 204 bears against a ball 229, and moves it in the direction of the Z-axis. Ball 229 bears against surface 138 of working platform 137, moving the platform in the direction of the Z-axis. Pin 285 serves to retain spring 237 in bore 269 and to prevent kinking of the spring.

Adjustment screw 231 is precision threaded in this embodiment with eighty threads per inch and passes through precision threaded shoulder nut 247. When adjustment screw 231 is turned, working platform 137 is moved in the direction of the Z axis. There is no rotational movement about the Z axis in the 5-axis micropositioner.

In an alternative embodiment of the 5-axis micropositioner, an adjusting screw passes through the raised right-hand portion of base plate 141, engages a threaded nut, and bears directly against ball 229, or a similar ball, similar to the configuration of adjusting screws 175 and and 177, but at 90 degrees to the adjusting direction of screws 175 and 177. This alternative avoids the need for plunger 205 and associated elements.

Working platform 137 and base plate 141 have slots 259 and 257 respectively, which provide clearance for a spring 199. Spring 199 urges working platform 137 toward base plate 141 and toward the raised right-hand portion of plate 141. Screws 281 and 283 hold the spring in place. In some embodiments more springs are used than in the embodiment described, and located in somewhat different ways than described herein. Spring 199 exerts a restoring force equal to several times the expected acceleration forces resulting from movement of components. As in the previously described embodiment, elements that have contact with other elements are lubricated with a low vapor pressure synthetic lubricant, which avoids evaporation and serves to keep the parts lubricated for long periods.

Adjuster plate 139 has four threaded holes 161, 163, 165, and 167 in the present embodiment that provide a convenient method for mounting objects and instruments to be positioned to the plate. The placement of the mounting holes is a convenience rather than a requirement, and in other embodiments there may be no mounting holes at all, or different patterns of mounting holes. In some embodiments, such as those that may be dedicated to positioning a specific instrument, there be no adjuster plate at all.

Figure 10:
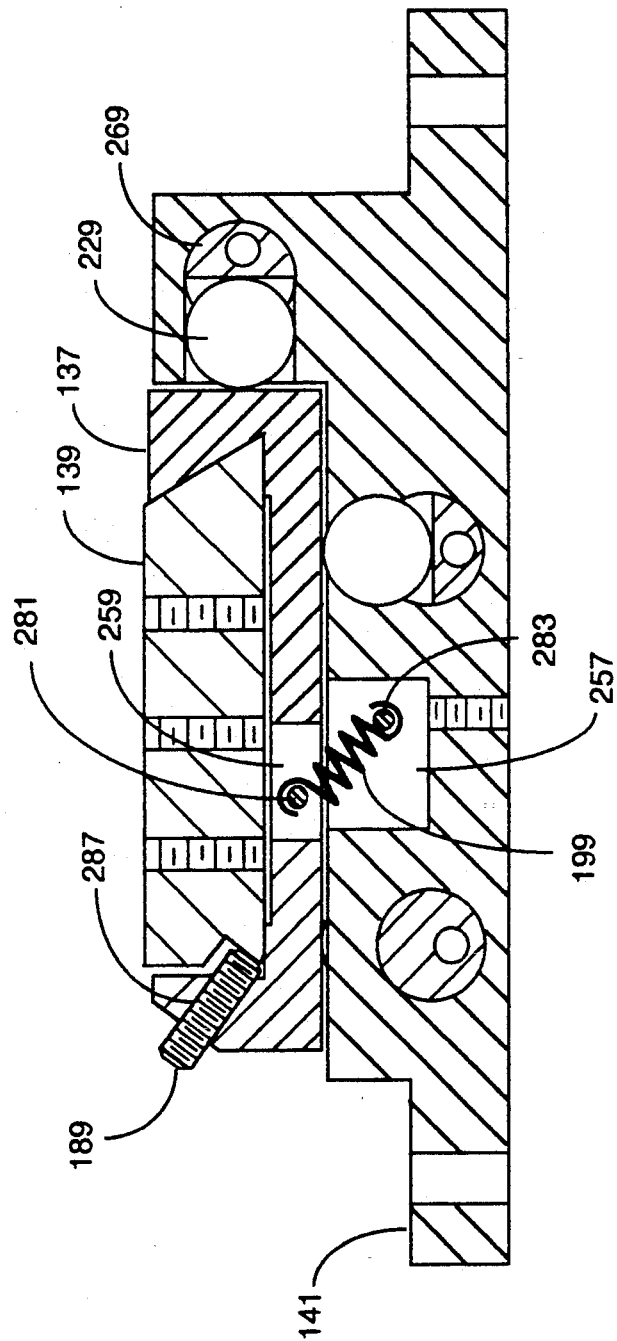
FIG. 10 is a section view along line 10—10 of FIG. 8

FIG. 10 is a section view taken along lines 10—10 of FIG. 8. Working platform 137 is configured in this embodiment to mount an adjuster plate 139. Adjuster plate 139 is held securely against working platform 137 by an angle formed by the right-hand side of working platform 137, which allows adjuster plate 139 to slide in snugly against working platform 137. Working platform 137 also has a threaded hole 287 in the left-hand portion, angled at about 30°. A screw 189 is engaged in hole 287 and serves to clamp adjuster plate 139 against working platform 137.

Figure 11:
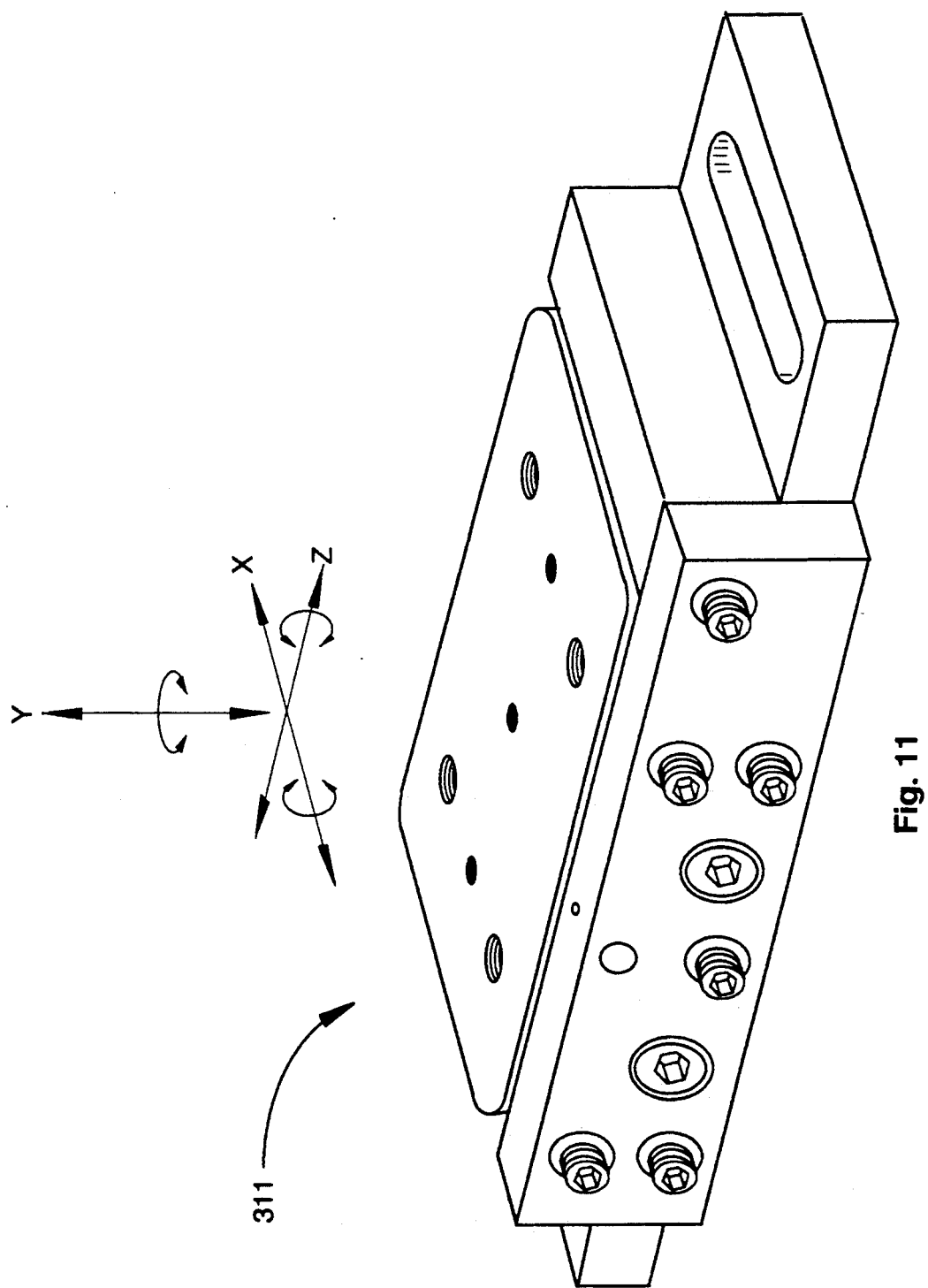
FIG. 11 is an isometric view of a six-axis micropositioner.
Figure 12:
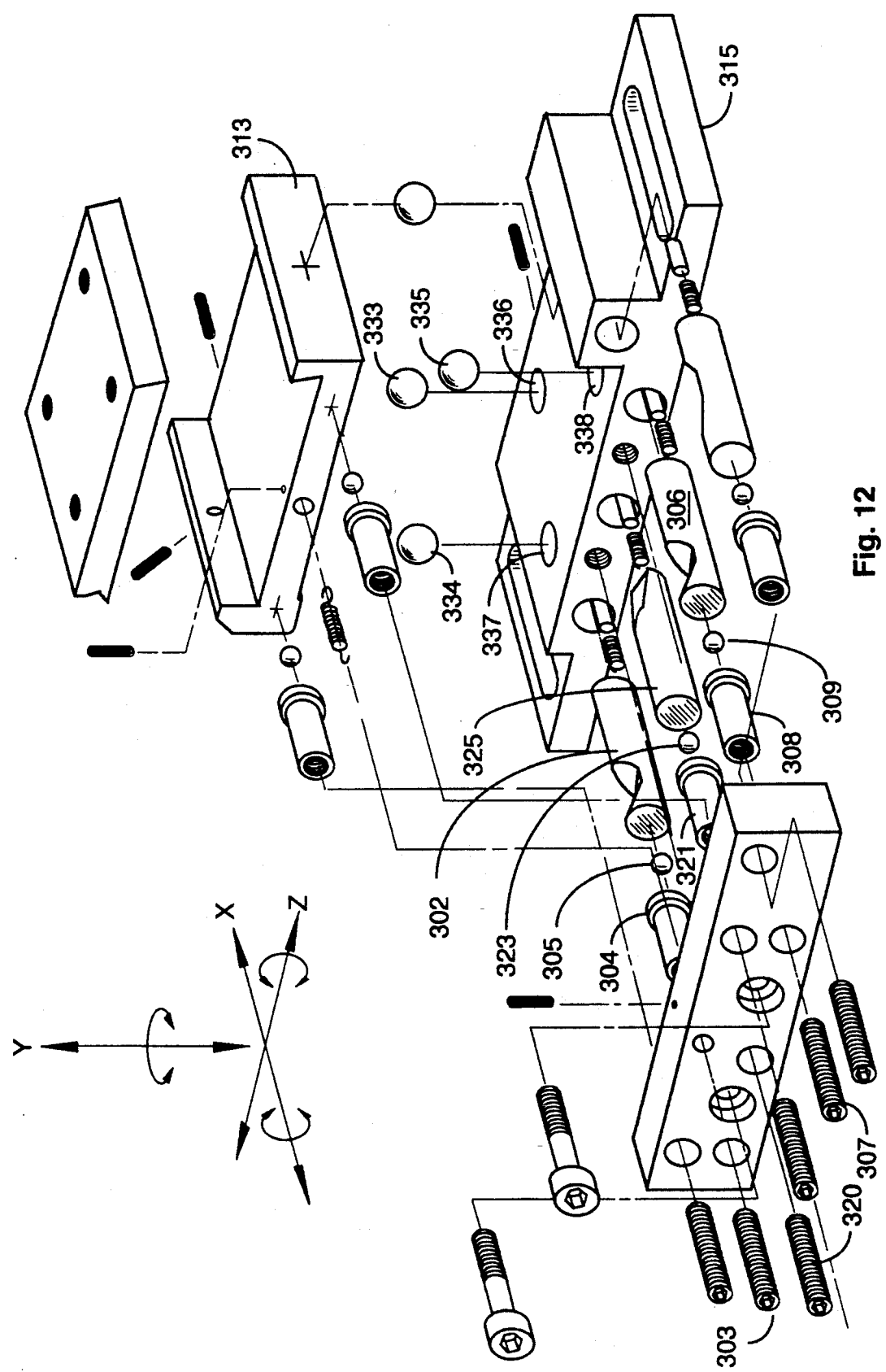
FIG. 12 is an exploded view of the positioner of FIG. 11.

FIG. 11 is an isometric view of a six-axis precision micropositioner 311. FIG. 12 is an exploded view of the positioner of FIG. 11. The six-axis micropositioner allows the same four degrees of freedom as the four-axis positioner plus translation in the Z direction, as in the 5-axis micropositioner, and rotation about the Z axis, which is the sixth degree of freedom. Rotation about the Z-axis is accomplished by adjusting the three balls that the working platform rests upon individually. Review of the 4-axis and the 5-axis micropositioner reveals that in both cases one of the plungers for moving balls in the vertical direction (Y-axis direction) has two inclined planes and moves two balls at the same time with the single plunger. In the six-axis micropositioner each of the balls for vertical movement is adjusted by a dedicated plunger.

Referring to FIG. 12, a working platform 313 is supported on three balls 333, 334, and 335, guided vertically in bores 336, 337, and 338 respectively. Ball 334 is moved vertically by a plunger 302, which is moved in the X-direction by an adjusting screw 303 engaged in a threaded nut 304, and urging against a ball 305 which in turn bears against plunger 302. Ball 333 is moved vertically by plunger 325, which is moved in the X-direction by adjusting screw 320 engaged in threaded nut 321 and bearing against ball 323, which in turn bears against plunger 325. Ball 335 is moved vertically by plunger 306, which is moved in the X-direction by adjusting screw 307 engaged in threaded nut 308 and bearing against ball 309, which in turn bears against plunger 306.

Bores 337 and 338 are arranged so balls 337 and 338 contact working platform 313 on a line parallel to the Z-axis, and ball 333 contacts the working platform at a point not on the same line, and toward the back of the platform in this embodiment. In a preferred embodiment, the points of contact of the three balls form an isosceles triangle with the unequal side the side connecting balls 334 and 335. By turning adjusting screw 320 then, rotation of platform 313 about an axis parallel to the Z axis is accomplished. Z-axis rotation may also be accomplished by adjusting screws 303 and 307 by the same amount in the same direction. Rotation about the X-axis may still be accomplished, by turning adjusting screw 303 and 307 by the same degree in opposite directions, assuming the adjusting screws have the same thread, both in hand and pitch. The other 4 degrees of freedom are accomplished as described above for other embodiments.

It will be apparent to a person with skill in the art that there are a wide variety of changes that might be made without departing from the spirit and scope of the invention. For example, there are a wide variety of materials that might be used for the various elements of the positioner. The materials described are convenient. Similarly, the device could be larger or smaller than the embodiment described. The size of the positioner is a function of the range of objects or instruments expected to be applied to the platform to be adjusted in position. The angles of the inclined planes could be different, the thread pitch could also be different than that described, and the positions of the balls might be different. There are many other changes that would not depart from the spirit and scope of the invention.

What is claimed is:

1. A micropostioner for adjusting position of an object, comprising:
   adjustable platform means for supporting and positioning the object;
   a frame means having a portion underlying the platform means;
   first, second, and third balls contacting and supporting the adjustable platform means;
   translatable plane means contacting the first, second, and third balls for adjusting the vertical position of the balls to translate the platform means vertically and to rotate the platform means about at least one substantially horizontal axis.

2. A micropositioner as in claim 1 further comprising first adjustment means contacting a first side of the platform means for translating the platform means in a first substantially horizontal direction.

3. A micropositioner as in claim 2 further comprising second adjustment means contacting a second side of the platform means at two points for translating the platform means in a second substantially horizontal direction and for rotating the platform means about a substantially vertical axis.

4. A micropositioner as in claim 3 wherein the first adjustment means comprises a first adjustment screw engaged in threads in a first vertical portion of the frame means extending alongside the first side of the platform means, and the second adjustment means comprises a second and a third adjustment screw engaged in threads in a second vertical portion of the frame means extending alongside the second side of the platform means.

5. A micropositioner as in claim 3 further comprising tensioning means for urging the platform means against the first, second, and third balls and toward both the first and the second adjustment means.

6. A micropositioner as in claim 5 wherein the tensioning means comprises extension springs fastened at one end to the platform means and at the other end to the frame means.

7. A micropositioner as in claim 2 wherein the first adjustment means comprises a first adjustment screw engaged in threads in a first vertical portion of the frame means extending alongside the first side of the platform means.

8. A micropositioner as in claim 2 wherein the first adjustment means comprises a ball contacting the first side of the platform means, the ball guided in a first substantially horizontal bore in a vertical portion of the frame means extending alongside the first side of the platform means, the ball contacted and positioned by an inclined plane formed on an adjustable plunger guided in a second substantially horizontal bore in the vertical portion of the frame means, the second substantially horizontal bore intersecting the first substantially horizontal bore.

9. A micropositioner as in claim 1 wherein the frame means in the portion underlying the platform means comprises first, second, and third substantially vertical guide bores for guiding the first, second, and third balls, and wherein the translatable plane means comprises adjustable plungers guided in substantially horizontal guide bores in the frame means, the plungers having inclined planes formed thereon, the horizontal guide bores intersecting the vertical guide bores such that the inclined planes contact the first, second, and third balls.

10. A micropositioner as in claim 9 wherein the translatable plane means comprises a first and a second adjustable plunger, the first adjustable plunger having two inclined planes formed thereon and guided in a first one of the horizontal guide bores intersecting two of the vertical guide bores, translation of the first adjustable plunger thereby adjusting two of the balls vertically, and the second adjustable plunger guided in a second one of the horizontal guide bores intersecting the remaining vertical guide bore, thereby adjusting the third of the balls vertically.

11. A micropositioner as in claim 9 wherein the translatable plane means comprises a first, a second, and a third adjustable plunger, each adjustable plunger having a single inclined plane formed thereon, and guided in a horizontal guide bore intersecting a single vertical guide bore, each of the first, second, and third balls being thusly individually adjustable vertically.

12. A micropositioner as in claim 1 further comprising tensioning means for urging the platform means against the first, second, and third balls.

13. A micropositioner as in claim 12 wherein the tensioning means is an extension spring having one end fastened to the platform means and the other end fastened to the frame means.

14. A micropositioner as in claim 1 wherein the frame means comprises slotted openings for engaging fasteners to adjustable fasten the micropositioner to a supporting surface.

15. A micropositioner as in claim 1 wherein the adjustable platform means comprises a generic mounting configuration for a separable working plate, said separable working plate for fastening to the object to be positioned, whereby objects of differing mounting configuration may be mounted to the same adjustable platform means.

16. A method for positioning an object comprising steps of:
   placing the object on a platform supported on three balls, the balls guided in vertical bores in a frame having a horizontal portion underlying the platform, the vertical bores intersecting horizontal bores in the horizontal portion wherein plungers having inclined planes machined thereon and in contact with the balls are adjustable to move the balls vertically to adjust the position of the platform; and
   turning first adjustment screws bearing on the plungers to position the plungers to adjust the vertical position of the platform and to rotate the platform around at least one horizontal axis.

17. The method of claim 16 wherein there are two plungers, a first plunger having one inclined plane for adjusting the position of the first of the three balls, and a second plunger having two inclined planes for adjusting the position of the second and third of the three balls.

18. The method of claim 16 wherein the frame has a first vertical portion extending alongside a first side of the platform and threadably engaging a second adjustment screw for moving the platform in a first horizontal direction, and a second vertical portion extending alongside a second side of the platform and threadably engaging two third adjustment screws for moving the platform in a second horizontal direction and rotating the platform around a vertical axis, comprising a further step of:
   turning said second and third adjustment screws to adjust the horizontal position of the platform and to rotate the platform around a vertical axis.

* * * * *